United States Patent
Ching et al.

(10) Patent No.: US 7,209,943 B1
(45) Date of Patent: *Apr. 24, 2007

(54) METHOD AND SYSTEM FOR EFFICIENT FILE TRANSFER TO/FROM A LOCAL TRAFFIC SYSTEM WITH A DMD SYSTEM

(75) Inventors: Jennie Ching, Northridge, CA (US); Eric Hsiao, San Marino, CA (US); Peter S. Lee, Calabasas, CA (US); Cris Sandoval, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,832

(22) Filed: Mar. 13, 2000

(51) Int. Cl.
*G06F 15/16* (2006.01)

(52) U.S. Cl. ............... 709/203; 709/217; 725/136; 725/115

(58) Field of Classification Search .............. 725/34, 725/32, 36, 105, 109, 114, 115, 119, 120, 725/138, 144, 145; 709/225, 203, 219, 246; 379/88; 386/109, 83, 46
See application file for complete search history.

(56) References Cited

U.S. PATENT DOCUMENTS

| | | | |
|---|---|---|---|
| 4,724,491 A | | 2/1988 | Lambert |
| 5,055,924 A | | 10/1991 | Skutta |
| 5,424,770 A | | 6/1995 | Schmelzer et al. |
| 5,432,542 A | | 7/1995 | Thibadeau et al. |
| 5,450,122 A | | 9/1995 | Keene |
| 5,515,098 A | * | 5/1996 | Carles .......... 725/35 |
| 5,659,351 A | | 8/1997 | Huber |
| 5,726,909 A | * | 3/1998 | Krikorian ........ 700/94 |
| 5,761,432 A | * | 6/1998 | Bergholm et al. ...... 709/226 |
| 5,887,243 A | | 3/1999 | Harvey et al. |
| 5,892,535 A | * | 4/1999 | Allen et al. .......... 725/36 |
| 5,960,406 A | * | 9/1999 | Rasansky et al. ........ 705/9 |
| 5,990,884 A | * | 11/1999 | Douma et al. ........ 345/716 |
| 6,035,323 A | * | 3/2000 | Narayen et al. ....... 709/201 |
| 6,088,796 A | * | 7/2000 | Cianfrocca et al. ...... 713/152 |
| 6,185,573 B1 | * | 2/2001 | Angelucci et al. .... 707/104.1 |
| 6,192,410 B1 | * | 2/2001 | Miller et al. ......... 709/232 |
| 6,212,560 B1 | * | 4/2001 | Fairchild ............. 709/223 |
| 6,336,115 B1 | * | 1/2002 | Tominaga et al. ....... 707/10 |
| 6,370,550 B1 | * | 4/2002 | Douma et al. ........ 707/500.1 |
| 6,411,685 B1 | * | 6/2002 | O'Neal .............. 379/88.14 |
| 6,412,009 B1 | * | 6/2002 | Erickson et al. ....... 709/228 |
| 6,438,125 B1 | * | 8/2002 | Brothers ............. 370/352 |
| 6,446,108 B1 | * | 9/2002 | Rosenberg et al. ..... 709/203 |
| 6,463,585 B1 | * | 10/2002 | Hendricks et al. ...... 725/35 |

(Continued)

FOREIGN PATENT DOCUMENTS

WO    WO9608923 A1    3/1996

*Primary Examiner*—Marc D. Thompson
(74) *Attorney, Agent, or Firm*—Sawyer Law Group LLP

(57) ABSTRACT

Aspects for achieving efficient file transfer and traffic management in a digital media distributor system are presented. The aspects include a central site server, at least one local traffic system, and an Internet file server (IFS) coupled between the central site server and the at least one local traffic system. The IFS acts as an intermediary between the central site and the at least one local traffic system, wherein the IFS supports file transfer in both directions between the central site and the at least one local traffic system.

22 Claims, 3 Drawing Sheets

U.S. PATENT DOCUMENTS

| | | | |
|---|---|---|---|
| 6,466,734 B2 * | 10/2002 | Yuen et al. | 386/83 |
| 6,487,721 B1 * | 11/2002 | Safadi | 725/36 |
| 6,513,069 B1 * | 1/2003 | Abato et al. | 709/218 |
| 6,647,417 B1 * | 11/2003 | Hunter et al. | 709/225 |
| 6,687,737 B2 * | 2/2004 | Landsman et al. | 709/203 |
| 6,698,020 B1 * | 2/2004 | Zigmond et al. | 725/34 |
| 6,792,615 B1 * | 9/2004 | Rowe et al. | 725/37 |
| 6,799,326 B2 * | 9/2004 | Boylan et al. | 725/35 |
| 6,810,527 B1 * | 10/2004 | Conrad et al. | 725/76 |

* cited by examiner

US 7,209,943 B1

METHOD AND SYSTEM FOR EFFICIENT FILE TRANSFER TO/FROM A LOCAL TRAFFIC SYSTEM WITH A DMD SYSTEM

FIELD OF THE INVENTION

The present invention relates to digital media distribution, and more particularly to efficient file transfer and traffic management for communications between a local traffic system and a central site of a digital media distributor (DMD) system.

BACKGROUND OF THE INVENTION

Although broadcasters have sophisticated systems for inserting national commercials into a program stream, including integrated traffic and billing systems, there are numerous obstacles to implementing a system to insert local commercials at small markets into a national program feed distributed by satellite. Until now, such local spot insertion advertising was the responsibility of the local broadcaster or cable operator.

Inserting local advertising poses several nontrivial technical, logistical and business challenges. First, literally hundreds of widely distributed local operators (or affiliates) would need to receive the commercials; ad agencies would have to ship analog tapes to hundreds of organizations, with different traffic and billing systems. These tapes would need to be tested for quality assurance, tracked, and stored until needed. They would then have to be distributed to video tape recorders and readied for computer controlled playout (analog) at the proper time, 24 hours a day, seven days a week. Such infrastructure generally exists at well-funded affiliates in major markets but is nonexistent and prohibitively expensive for smaller operators or affiliates in small markets.

Managing such tapes with ads for local commercials and inserting them properly into the program feed is a complex undertaking not well-suited for the smaller operators, especially for channels with smaller audiences in smaller markets. A quality broadcast involves more than excellent program material; it must provide seamless insertion of national and local advertisements, promotions, and station identifications.

Equally important is the ability to maintain the integrity of the national television programming. Centralized control of the channel's programming (playout) is required to prevent local affiliates from tampering with the programming.

A need exists for efficient communication between a local traffic system and a central site of a digital media distributor system. The present invention addresses such a need.

SUMMARY OF THE INVENTION

Aspects for achieving efficient file transfer and traffic management in a digital media distributor system are presented. The aspects include a central site server, at least one local traffic system, and an Internet file server (IFS) coupled between the central site server and the at least one local traffic system. The IFS acts as an intermediary between the central site and the at least one local traffic system, wherein the IFS supports file transfer in both directions between the central site and the at least one local traffic system.

Through the present invention, an Internet file server provides an intermediary for file transfers between a local traffic system and a central site server. In this manner, efficient management of communication results. Further, the Internet file server also achieves effective traffic management, particularly through the use of automated server agents. These and other advantages of the present invention will be more fully understood in conjunction with the following detailed description and accompanying drawings.

DETAILED DESCRIPTION

The present invention relates to efficient communication between a local traffic system and a central site in a digital media distributor system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a digital media distributor (DMD) provides a complete end-to-end system that gives local cable or network affiliates the ability to provide local ads and announcement insertion together with the delivery of cable or network feed(s). In general, the DMD integrates the entire process of sales, traffic, digital encoding and storage of spots, transmission of data, local insertion of digital ads and announcements, account reconciliation, and billing. Spots (i.e., media such as commercials, station identification, public service announcements, etc.) are digitized by the cable or network operator, and then digitally transmitted to the local cable head-ends or network affiliates from a central site. These digital spots are then stored on the remote site servers located at each head-end or affiliate.

Figure 1:
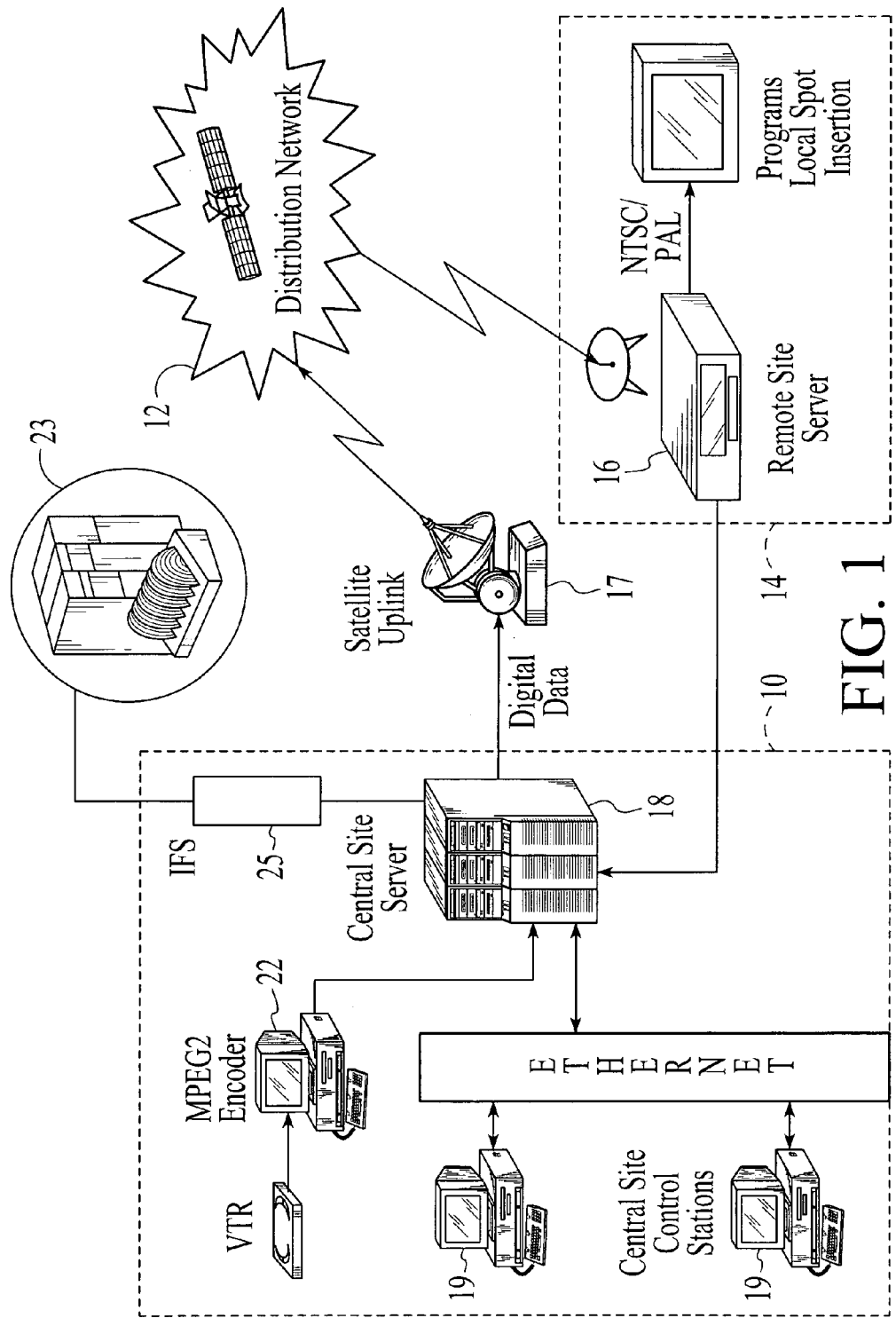
FIG. 1 illustrates a block diagram of a digital media distribution system, including an Internet file server (IFS), in accordance with the present invention.

A block diagram of a DMD in accordance with the present invention is illustrated in FIG. 1. As shown, the DMD includes three major components: a central site 10, a distribution network 12, and a remote site 14. The central site 10 is the location for the digital encoding of MPEG-2 files from source video tapes, storage and management of digital files, management of remote site(s) 14, and distribution of schedules and MPEG-2 files. Thus, the processing, analysis, distribution, and management of data occurs at the central site 10. The distribution network 12 is the mechanism by which the remote site(s) 14 receive program streams and digital spots. The data distribution is accomplished via various methods, such as a satellite and/or land-based distribution. The broadcaster may choose to have the program stream sent via terrestrial links (e.g., token ring, ethernet, etc.), while the spot insertion is sent via satellites or vice versa.

The remote site(s) 14 house the remote site server(s) 16. By way of example, a suitable remote site server 16 includes a Pentium processor-based device with a hard disk for local storage and a video switch card (to switch between program and commercial insertion) running software including Windows NT, DMD programming, Lotus Notes client, Program Loader, and Symantec pcANYWHERE. These unattended, computerized systems receive the local insertion and provide As-Run file generation. The remote site server 16 is a video server that receives and stores digitized spots utilized for local insertion at the cable head-end. The remote site server 16 receives digitally encoded ads via satellite or other distribution network. These spots are decoded to an analog signal and inserted into the cable or network operator feed at scheduled times, i.e., into scheduled local availability times. The remote site server 16 can be customized in various configurations based on the number of output channels required, the type of output format (e.g., NTSC, PAL), the amount of local storage required (i.e., the number of spots on disk), the type of network (satellite or terrestrial), the type of trigger for spot insertion (e.g., time of day, VITC, cue-tome, VBI trigger), the audio format and connections (stereo, mini-XLR or XLR), the redundancy requirements (RAID, mirrored disks), and the preview channel.

By way of example, the following provides a sample process that illustrates an example of one process which the DMD solution can support. A region, e.g., any grouping of one or many cable head-ends for cities, states, provinces, or countries, defined by cable or network operators in an area, sells a commercial in the local availability time. All remote site servers 16 within the same region play the same material at the same time, including all network programs, national spots, local commercials, announcements, etc. The video-taped segment for the commercial is digitally encoded. The digital material is scheduled for delivery to each remote site server 16 prior to broadcast. The playlist, digitized spots, and the broadcast program stream are sent, via satellite, to all of the remote site servers 16 within the region. All of the remote site servers 16 within the region air the local spots for that region at the scheduled time. As-Run logs are retrieved by the central site 10 from the remote site servers 16. As-Run logs are sent to the local markets, reviewed, reconciled, and customers are billed. Commercials and As-Run logs are archived.

A main component in the central site 10 is the central site server 18. By way of example, a suitable central site server 18 includes an IBM RS/6000 F50 dual CPU system, or a Pentium II compatible PC, running the IBM UNIX operating system, AIX, DB2 server software, Lotus Notes server software, ADSM, Windows NT (for PC-based central site server), and the DMD programming. Suitable components for the control workstations 19 include Pentium compatible PCs running Windows NT, Lotus Notes client, DB2 client, Microsoft Internet Explorer, and DMD programming.

Figure 2:
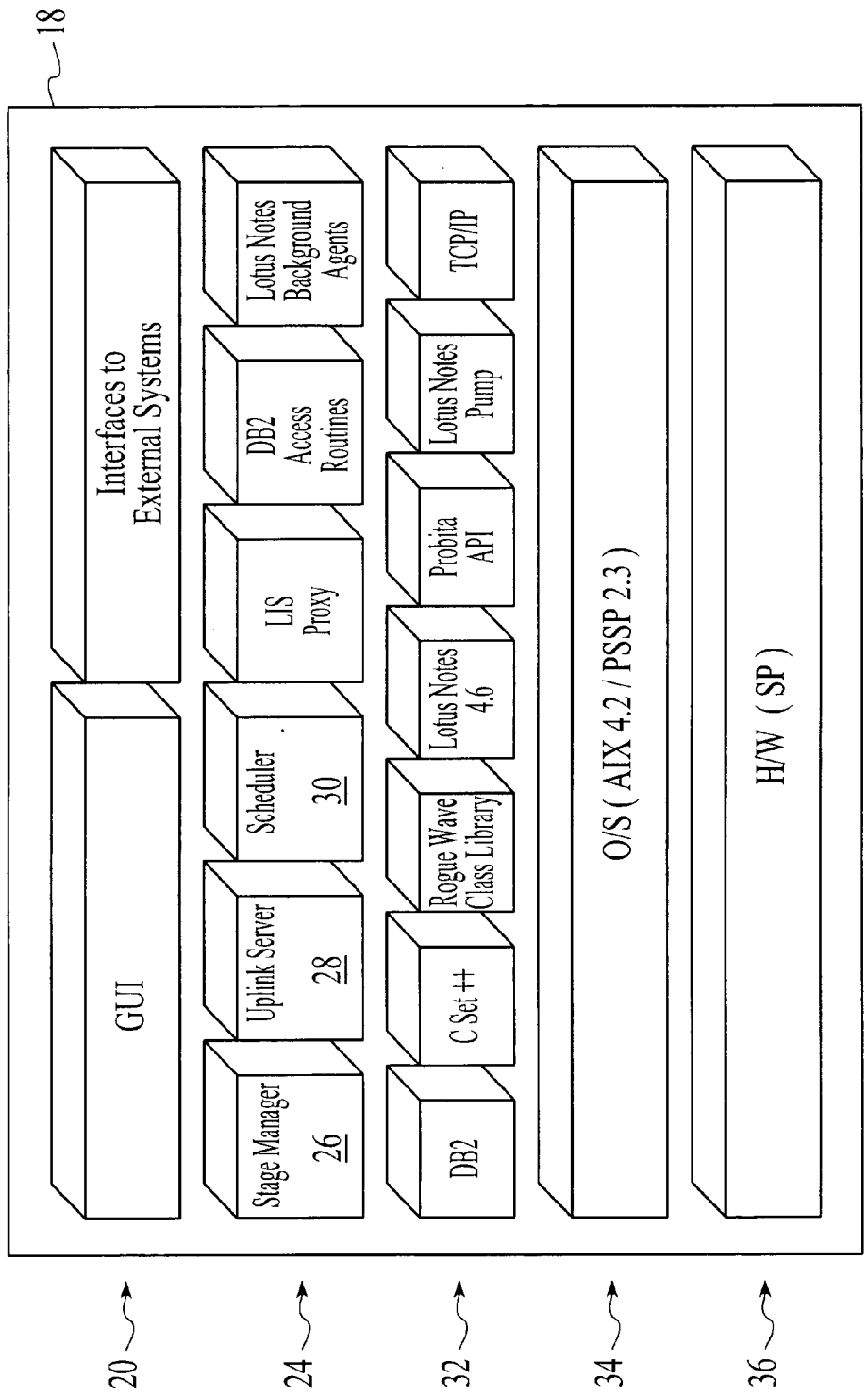
FIG. 2 illustrates an example of a suitable layered architecture for the central site server.

The central site server 18 includes software on a suitable computer readable medium that is architected using a layered model, in which each layer isolates the upper layers from the details of the lower layers and individual components within a layer provide a unique set of services, as is well appreciated by those skilled in the art. FIG. 2 illustrates an example of a suitable layered architecture for the central site server 18. The top layer 20 addresses the external interfaces of the central site server 18, including a graphical user interface (GUI) component and the interfaces to the external systems. The GUI component, e.g., using Lotus Notes, provides administrators and operators with the ability to monitor and control the DMD. In accordance with the present invention, the interfaces to external systems include interfaces to traffic systems 23 (FIG. 1), which interface to the central site server 18 by way of files exchanged on an Internet file server 25 (FIG. 1) in accordance with the present invention, as described more particularly hereinbelow, interfaces to stations in a box (SIBs) which send Lotus Notes messages, and interfaces to encoder systems (22, FIG. 1), which store encoded spot files in a disk pool server for retrieval by the central site server 18.

Underneath the top layer is a layer 24 of specialized components including a stage manager component 26, an uplink server component 28, and a transmission scheduler component 30. This layer 24 may also include specialized components for creating commands and interpreting responses from SIBs, managing access to all the database queues and other data stores, and providing automated agents that run based on time or events to manage the external interfaces, e.g., processing files received from traffic systems. The stage manager 26 manages any tape related activity, the uplink server 28 manages transmissions through the uplink network (12, FIG. 1), and the transmission scheduler manages scheduling tasks in accordance with the present invention, as described in more detail hereinbelow. Also included as a next layer is a programming layer 32. The layer 32 includes the programming libraries and APIs (application programming interfaces) that are used to build the specialized components. The lower two layers include an operating system layer 34 and a hardware layer 36 for the fundamental operation of the central site server 18, as is well appreciated by those skilled in the art.

Referring again to FIG. 1, the Internet file server (IFS) 25 acts an intermediary between the central site server 18 and the local traffic system(s) 23. The purpose of the IFS 25 is to support the transfer of text files in both directions between the local traffic system(s) 23 and the central site server 18. All file transfers are initiated by the local traffic system(s) 23, using a desired Internet transfer protocol, e.g., FTP (file transfer protocol) or HTTP (hypertext transfer protocol). The IFS 25 handles both inbound and outbound file transfers for local traffic system(s) 23. For SIBs at remote sites 14, the central site server 18 handles their inbound transfers.

In general terms, local affiliate advertisers place information (in a text file) on the IFS 25. DMD processes running on the IFS 25 first validate the information and then pass the information to the central site server 18. Information passed between the DMD and the local traffic system 23 includes billing information, objects (e.g., master program, local playlists, network break time), and object status (e.g., spot status). For scheduling, the traffic system initiates scheduling and publishes the master log identifying the times for local breaks within a broadcast day. The affiliate uses the local traffic system 23 to assign spots to the local breaks, creating affiliate playlists. This scheduling information is retrieved from the IFS 25 and automatically imported and analyzed by the central site server 18 to create playlists for each zone and to determine a transmission schedule and playlists for SIBs.

Thus, several of the databases on the central site server 18 contain information that must be received from local traffic system(s) 23. Other databases contain information that must be sent to local traffic system(s) 23. In all of these cases, the local traffic system(s) 23 do not communicate directly with the central site server 18. Instead, they communicate with the IFS 25, which, in turn, replicates information with the central site server 18.

For each type of file, transfers occur in only one direction, i.e., from the local traffic system(s) 23 to the IFS 25, or from the IFS 25 to the local traffic system(s) 23, but not both. The file types, and their transfer directions, are as follows:

Playlist: inbound from the local traffic system 23 to the IFS 25;

Dub list: inbound from the local traffic system 23 to the IFS 25;

Purge list: inbound from the local traffic system 23 to the IFS 25;

Spot status summary: outbound from IFS 25 to the local traffic system 23; and Consolidated As-Run log: outbound from the IFS 25 to the local traffic system 23.

For exchanging files with the local traffic system(s) 23, the IFS 25 provides simultaneous support for both Web browsers (or automated Web agents) and FTP. As described in the following, the IFS 25 provides dual protocol support for both inbound and outbound file transfer.

Inbound (from the Local Traffic System 23 to the IFS 25):

Web Browser or Web Agent Method:

The local traffic system 23 connects to the appropriate database on the IFS 25 via a web browser or web agent and creates a new document (HTML form). The local traffic system 23 then uploads a file via a file upload control (e.g., a JavaScript). An agent detects the new file and makes an entry in the file transfer log.

FTP Method:

The local traffic system 23 opens an FTP session on the IFS 25, as the appropriate user and transfers a file to the inbound FTP directory on the IFS 25. An agent in the appropriate database scans the inbound FTP directory for new files. When a new file is found, the agent creates a new document and attaches the file. The agent then deletes the file from the FTP directory and makes an entry in the file transfer log.

Outbound (from the IFS 25 to the Local Traffic System 23):

Web Browser or Web Agent Method:

The local traffic system 23 connects to the appropriate database on the IFS 25 via a web browser or a web agent and selects the appropriate document to view and opens it. The local traffic system 23 then downloads the attachment from the document.

FTP Method

A agent in the appropriate database on the IFS 25 scans for new documents. When a new document is found, the agent takes the attachment and detaches it to the appropriate outbound FTP directory. The local traffic system 23 opens an FTP session on the IFS 25 as the appropriate user and transfers available files from the outbound FTP directory.

Figure 3:
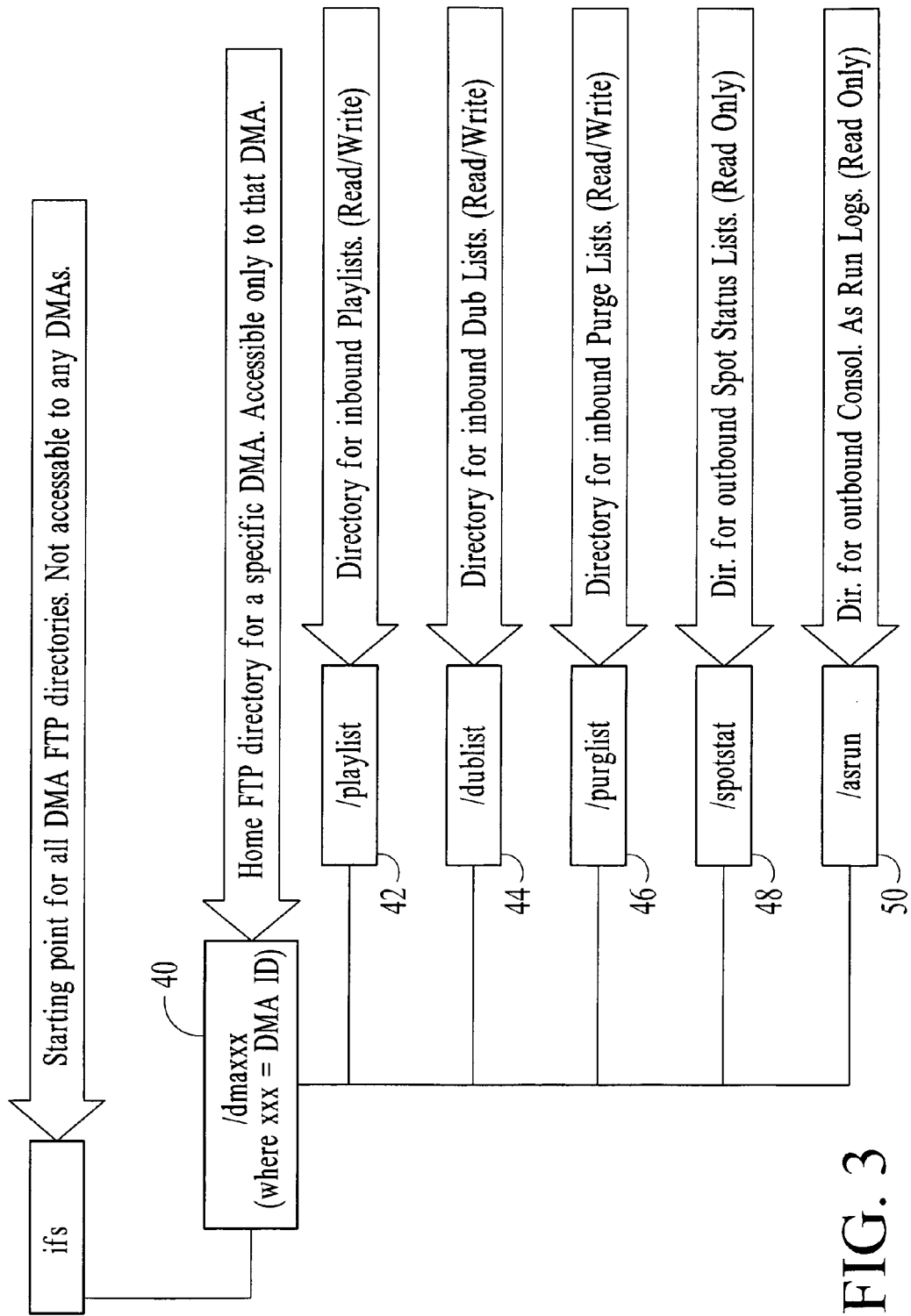
FIG. 3 illustrates a diagram of a directory structure example for the IFS.

As represented in an example directory structure diagram of FIG. 3, the directory structure for the FTP directories implement a home directory 40 for each DMA, where a DMA refers to the group or unit in the local area that will receive and broadcast program material and perform ad insertion. When a local traffic system 23 connects to the IFS 25 using FTP, it is required to log in using a user name and password that have been uniquely assigned to it based on its DMA, which places the DMA's local traffic system 23 in its own home directory. Within each DMA's home directory 40, there is a standard lower-level directory structure to which the DMA's local traffic system 23 is allowed to change directory. The subdirectory level under the home directory is used to separate files by type, such as playlist 42, dub list 44, purge list 46, spot status 48, and As-Run logs 50. The local traffic system 23 is given read permission throughout its directory tree, but write permission only for inbound directories, where it must deposit files.

Various agents (e.g., Lotus Notes server agents) in the IFS 25 are scheduled to run to perform automated processing of the files transferred to the IFS 25 and to perform scheduled tasks, such a preparing files to be downloaded by the local traffic system(s) 23. The agents include:

Import Playlists Agent: Finds playlist text files newly received by the IFS 25 (e.g., via FTP) and imports them into database playlist documents;

Transfer Playlists Agent: Transfers data from newly imported or edited playlist documents to the appropriate database;

Import Dub Lists Agent: Finds dub list text files newly received by the IFS 25 (e.g., via FTP) and imports them into database dub list documents;

Transfer Dub Lists Agent: Transfers data from newly imported dub list documents to the appropriate database;

Import Purge Lists Agent: Finds purge list text files newly received by the IFS 25 (e.g., via FTP) and imports them into database purge list documents;

Transfer Purge Lists Agent: Transfers data from newly imported purge list documents to the appropriate database;

Generate Full Spot Summary Agent: Generates a full spot summary text file;

Generate Delta Spot Summary Agent: Generates a spot summary text file of all changes since the previous day;

Export Spots Summaries Agent: Makes newly generated full and delta spot summary text files available for Internet transfer download by local traffic system(s) 23;

Generate Consolidated As-Run Log Agent: Generates a consolidated As-Run log file combining all As-Run files for the previous day;

Export Consolidated As-Run Log Agent: Makes newly generated consolidated As-Run log text files available for Internet transfer download by local traffic system(s) 23; and Export File Cleanup Agent: Deletes all exported files from outbound transfer directories after a designated time has elapsed.

Several databases are utilized for various file types, including NLBS, Playlist, Dub List, and Purge List databases. The NLBS database stores documents containing the Network Local Break Schedule for each day. It is used by the Playlist Import Agent for two purposes: (1) The Playlist Import Agent will not import a playlist if the NLBS document for that day is not yet available; and (2) If the NLBS document exists, the Playlist Import Agent will use it to assign Ids to the playlist entries.

The playlist database contains a document for each day's playlist, for each zone, for each DMA. Data for all entries in a given playlist is stored in fields within the database document. The original playlist text file is kept as a file attachment to the document. The central site 10 maintains the primary replica of the playlist database. The playlist database is also maintained on the IFS 25, in order to receive new playlists transferred by the DMAs. Once received on the IFS 25, playlists are imported into Notes documents. The database is then replicated to the central site server 18, where the play transfer task picks up the new playlists and updates the appropriate database as required.

The dub list database contains a document about spots soon to be required by each DMA, i.e., each day's dub list, for each DMA. Data for all entries in a given dub list is stored in fields within the database document. The original dub list text file is kept as a file attachment to the document. The central site 10 maintains the primary replica of the dub list database. The dub list database is also maintained on the IFS 25, in order to receive new dub lists transferred over by the DMAs. Once received on the IFS 25, dub lists are imported into the database document. The database is then replicated to the central site server 18, where the dub transfer tack picks up the new dub lists and updates the appropriate database as required.

The purge list database contains a document about spots no longer required by each DMA, i.e., each day's purge list for each DMA. Data for all entries in a given purge list is stored in fields within the database document. The original purge list text file is kept as a file attachment to the document. The central site 10 maintains the primary replica of the purge list database. The purge list database is also maintained on the IFS 25, in order to receive new purge lists transferred over by the DMAs. Once received on the IFS 25, purge lists are imported into the appropriate database documents. The database is then replicated to the central site server 18, where the purge transfer task picks up the new purge lists and updates the appropriate database as required.

Through the present invention, an Internet file server provides an intermediary for file transfers between a local traffic system and a central site server. In this manner, efficient management of communication results. Further, the Internet file server also achieves effective traffic management, particularly through the use of automated server agents.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for achieving efficient file transfer and traffic management in a digital media distributor system, the digital media distributor system giving broadcast program affiliates an ability to provide local advertisement and announcement insertion together with delivery of broadcast program feeds, the method comprising:
   providing an Internet file server (IFS) at a central site of the digital media distributor system, the central site including a central site server that stores files transferred to the digital media distributor system; and
   utilizing the IFS as an intermediary between the central site server and at least one local traffic system, the at least one local traffic system providing schedule times for the local advertisement and announcement insertion, the IFS supporting file transfer in both directions between the central site server and the at least one local traffic system including maintaining a copy of the files stored on the central site server.

2. The method of claim 1, wherein utilizing the IFS as an intermediary further comprises:
   receiving at the IFS inbound transfers of a playlist file from the at least one local traffic system; and
   replicating the playlist file to the central site server.

3. The method of claim 1, wherein utilizing the IFS as an intermediary further comprises:
   receiving at the IFS inbound transfers of a dub list file from the at least one local traffic system; and replicating the dub list file to the central site server.

4. The method of claim 1, wherein utilizing the IFS as an intermediary further comprises:
   receiving at the IFS inbound transfers of a purge list file from the at least one local traffic system; and
   replicating the purge list file to the central site server.

5. The method of claim 1, wherein utilizing the IFS as an intermediary further comprises performing outbound transfers from the IFS of a spot status summary file to the at least one local traffic system.

6. The method of claim 1, wherein utilizing the IFS as an intermediary further comprises performing outbound transfers from the IFS of a consolidated As-Run log file to the at least one local traffic system.

7. The method of claim 1, further comprising utilizing a plurality of agents to perform automated processing of files transferred to the IFS and to perform scheduled tasks including importing the processed files from the IFS to the central site server.

8. The method of claim 1, further comprising the at least one local traffic system having direct access to update the copy of the files maintained on the IFS but not having direct access to update the files stored on the central site server.

9. A system for achieving efficient file transfer and traffic management in a digital media distributor system, the digital media distributor system giving broadcast program affiliates the ability to provide local advertisement and announcement insertion together with delivery of broadcast program feeds, the system comprising:
   a central site server operable to stores files transferred to a central site of the digital media distributor system;
   at least one local traffic system, the at least one local traffic system providing schedule times for the local advertisement and announcement insertion; and
   an Internet file server (IFS) located at the central site and coupled between the central site server and the at least one local traffic system, the IFS acting as an intermediary between the central site server and the at least one local traffic system, the IFS supporting file transfer in both directions between the central site and the at least one local traffic system including maintaining a copy of the files stored on the central site server.

10. The system of claim 9, wherein the IFS receives inbound transfers of a playlist file from the at least one local traffic system and replicates the playlist file to the central site server.

11. The system of claim 9, wherein the IFS receives inbound transfers of a dub list file from the at least one local traffic system and replicates the dub list file to the central site server.

12. The system of claim 9, wherein the IFS receives inbound transfers of a purge list file from the at least one local traffic system and replicates the purge list file to the central site server.

13. The system of claim 9, wherein the IFS performs outbound transfers of a spot status summary file to the at least one local traffic system.

14. The system of claim 9, wherein the IFS performs outbound transfers of a consolidated As-Run log file to the at least one local traffic system.

15. The system of claim 9, wherein the IFS further utilizes a plurality of agents to perform automated processing of files transferred to the IFS and to perform scheduled tasks including importing the processed files from the IFS to the central site server.

16. The system of claim 9, wherein the at least one local traffic system has direct access to update the copy of the files maintained on the IFS but does not have direct access to update the files stored on the central site server.

17. A method for achieving efficient file transfer and traffic management in a digital media distributor (DMD) system, the DMD system giving broadcast program affiliates an ability to provide local advertisement and announcement insertion together with delivery of broadcast program feeds the method comprising:

utilizing an intermediary for file transfers between a central site server and a local traffic system including maintaining a copy of files stored on the central site server at the intermediary, the at least one local traffic system providing schedule times for the local advertisement and announcement insertion for the DMD system, wherein the intermediary and the central site server are located at a central site of the DMD system;

exchanging files according to a chosen Internet transfer protocol between the local traffic system and the intermediary; and replicating the exchanged files at the intermediary to the central site server.

18. The method of claim 17, wherein utilizing an intermediary comprises utilizing an Internet server.

19. The method of claim 17, wherein exchanging files further comprises exchanging files according to a file transfer protocol (FTP).

20. The method of claim 17, wherein exchanging files further comprises exchanging files according to a hypertext transfer protocol (HTTP).

21. The method of claim 17, further comprising utilizing agents in the IFS to automatically import list files into pre-determined documents stored at the IFS and transfer the pre-determined documents to a database in the IFS.

22. The method of claim 17, further comprising utilizing agents in the IFS to automatically generate and export summary files for download by the local traffic system.

* * * * *